United States Patent
Kobayashi (10) Patent No.: US 9,962,932 B2
(45) Date of Patent: May 8, 2018

(54) PRINT INFORMATION PROCESSING APPARATUS AND PRINT INFORMATION PROCESSING METHOD

(71) Applicant: CANON KABUSHIKI KAISHA, Tokyo (JP)

(72) Inventor: Tomoki Kobayashi, Yokohama (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 0 days. days.

(21) Appl. No.: 15/485,947

(22) Filed: Apr. 12, 2017

(65) Prior Publication Data
US 2017/0305151 A1 Oct. 26, 2017

(30) Foreign Application Priority Data
Apr. 25, 2016 (JP) .................... 2016-087217

(51) Int. Cl.
*B41J 2/045* (2006.01)
*H04N 1/00* (2006.01)
*H04N 1/04* (2006.01)

(52) U.S. Cl.
CPC ....... *B41J 2/04573* (2013.01); *B41J 2/04586* (2013.01); *H04N 1/00015* (2013.01); *H04N 1/00018* (2013.01); *H04N 1/0426* (2013.01)

(58) Field of Classification Search
CPC .............. B41J 2/04573; B41J 2/04586; H04N 1/00015; H04N 1/00018; H04N 1/0426
See application file for complete search history.

(56) References Cited

U.S. PATENT DOCUMENTS

| 9,409,390 B1 * | 8/2016 | Nishikori | ............. B41J 2/04541 |
| 9,751,299 B2 * | 9/2017 | Ochi | ................... B41J 2/04505 |
| 9,757,939 B2 * | 9/2017 | De Grijs | ................ B41J 2/0451 |

FOREIGN PATENT DOCUMENTS

JP 2013-237197 11/2013

* cited by examiner

*Primary Examiner* — Lamson Nguyen
(74) *Attorney, Agent, or Firm* — Fitzpatrick, Cella, Harper & Scinto (57) ABSTRACT

A print level information generating unit generates print level information representing the amount of ink to be applied to a predetermined area on a print medium. A print timing information generating unit generates print timing information indicating a timing, at which the ink is applied to the predetermined area. A print information combining unit outputs the print level information as the print information in a case where the amount of ink to be applied to the predetermined area is maximum or minimum. Moreover, the print information combining unit replaces a part of the print level information with at least a part of the print timing information so as to output, as the print information, information obtained by combining the print timing information and the print level information in a case where the amount of ink to be applied to the predetermined area is not maximum or minimum.

11 Claims, 11 Drawing Sheets

PRINT INFORMATION PROCESSING APPARATUS AND PRINT INFORMATION PROCESSING METHOD

BACKGROUND OF THE INVENTION

Field of the Invention

The present invention relates to a print information processing apparatus and a print information processing method.

Description of the Related Art

When a printout is formed by overprinting a plurality of kinds of ink in an ink-jet printing apparatus, it is desirable to control the overprinting order of the plurality of kinds of inks in order to improve a quality of an image. In an ink-jet printing apparatus, print heads eject a plurality of kinds of ink based on print information generated by an information processor so as to print an image on a print medium. The information processor determines the ink overprinting order based on input image information representing an image to be printed. In addition, since the amount of ink to be ejected at a predetermined area depends upon the input image information, it is determined by the information processor.

Japanese Patent Laid-Open No. 2013-237197 discloses transmitting print information on a timing, at which ink is ejected from a print head, and an ink amount and controlling the print head by a print control unit that receives the print information so as to superimpose a plurality of kinds of ink at a predetermined area on a print medium, thus achieving printing.

However, according to the technique disclosed in Japanese Patent Laid-Open No. 2013-237197, information on the amount of ink to be ejected at the predetermined area and information on the overprinting order of the plurality of kinds of ink on the print medium are transmitted independently of each other, thereby raising a problem to be solved of an increase in amount of data to be transmitted so as to enlarge a band of a data bus that connects the information processor and the print control unit to each other.

SUMMARY OF THE INVENTION

An object of the present invention is to provide a print information processing apparatus and a print information processing method, in which the data amount of print information used for printing an image on a print medium can be reduced so that a band, via which the print information is transmitted, can be reduced.

According to one aspect of the present invention, a print information processing apparatus includes: a print level information generating unit configured to generate print level information representing the amount of ink to be applied to a predetermined area on a print medium based on input pixel data; a print timing information generating unit configured to generate print timing information indicating a timing, at which the ink is applied to the predetermined area, based on the input pixel data; and a print information combining unit configured to combine the print level information and the print timing information so as to generate print information. The print information combining unit outputs the print level information as the print information in a case where the amount of ink to be applied to the predetermined area is maximum or minimum and the print information combining unit replaces a part of the print level information with at least a part of the print timing information so as to output, as the print information, information obtained by combining the print timing information and the print level information in a case where the amount of ink to be applied to the predetermined area is not maximum or minimum.

Further features of the present invention will become apparent from the following description of exemplary embodiments with reference to the attached drawings.

DESCRIPTION OF THE EMBODIMENTS

Embodiments according to the present invention will be described below in detail with reference to the attached drawings.

First Embodiment

Figure 1:
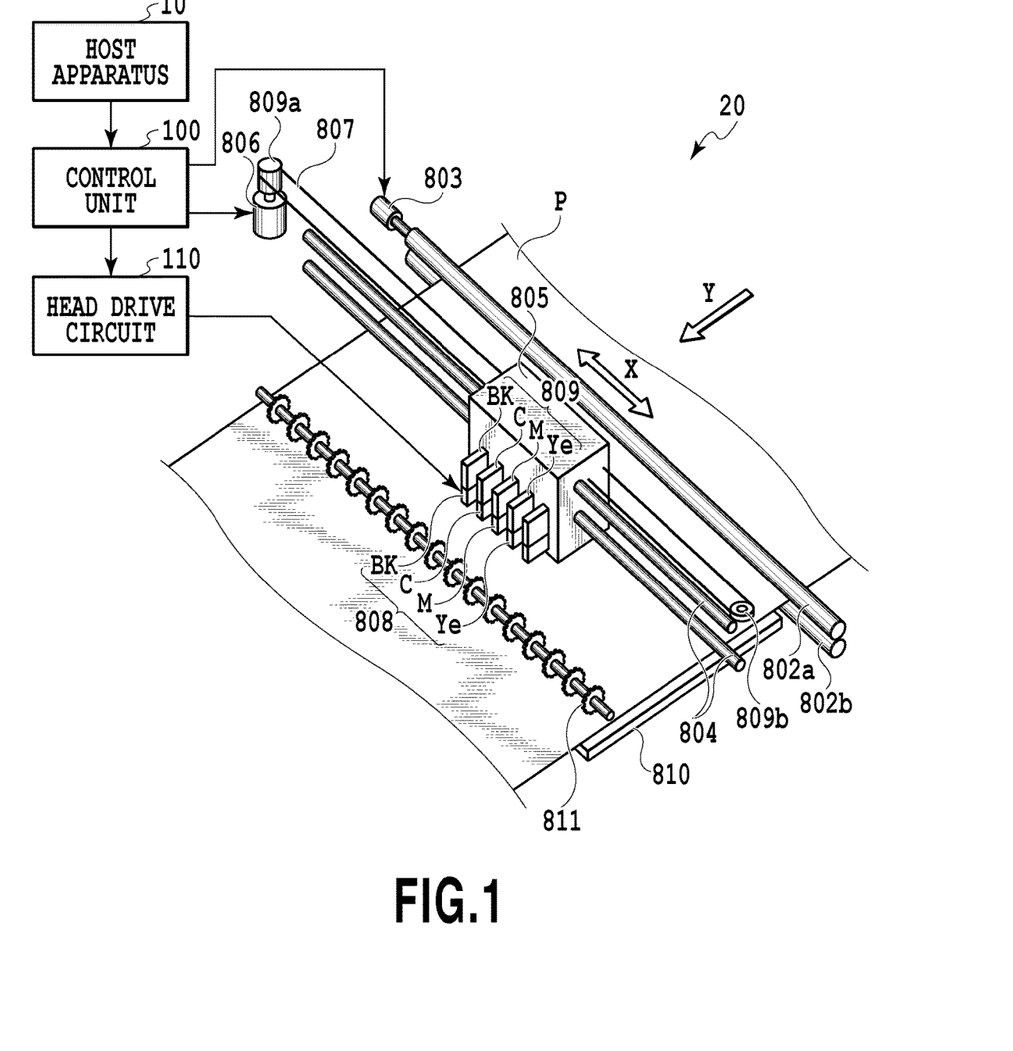
FIG. 1 schematically illustrates the configuration of an ink-jet printing apparatus in embodiments.

An ink-jet printing apparatus 20 in the present embodiment is exemplified by a serial type ink-jet printing apparatus that intermittently conveys a print medium in a predetermined direction, and furthermore, relatively moves a print unit in a direction crossing the conveyance direction of the print medium while ejecting ink so as to print an image on the print medium. FIG. 1 schematically illustrates the configuration of the ink-jet printing apparatus (hereinafter also simply referred to as a printing apparatus) 20 in the present embodiment.

In FIG. 1, a print medium P is supported by a platen 810, and is intermittently conveyed by a predetermined amount in a Y direction by a conveyance unit. The conveyance unit includes a pair of conveyance rollers 802a and 802b for holding the print medium P therebetween, a conveyance motor 803 for driving the conveyance roller 802a out of the pair of conveyance rollers 802a and 802b, and spurs 811 that are rotated while holding the print medium P between the platen 810 and the spurs 811.

Above the platen 810, a carriage 805 is supported in such a manner as to be movable along a guide shaft 804 arranged in a direction crossing the conveyance direction (i.e., the Y direction) of the print medium P (i.e., a perpendicular direction in the present embodiment (an X direction)). The carriage 805 is fixed to an endless belt 807 stretched across pulleys 809a and 809b, and thus, moves forward or reversely in the X direction according to the movement (hereinafter also referred to as scanning) of the endless belt 807 caused by forward or reverse rotation of a carriage motor 806.

On the carriage 805 are mounted print heads 808 capable of ejecting ink droplets toward the print medium P supported by the platen 810 and tanks 809 containing therein ink to be supplied to the print heads 808. The print heads 808 are provided for ejecting a plurality of different kinds of color ink in the scanning direction of the carriage 805 in order to form a color image. In the present embodiment, there are arranged a print head 808-BK for ejecting a black ink, a print head 808-C for ejecting a cyan ink, a print head 808-M for ejecting a magenta ink, and a print head 808-Ye for ejecting a yellow ink.

Each of the print heads 808 has a plurality of ejection ports at a predetermined density in the conveyance direction of the print medium P (i.e., the Y direction). Each of the ejection ports has an ejection energy generating element for ejecting ink droplets. The energy generating element is exemplified by, for example, an electrothermal transducer (i.e., a heater) or an electromechanical transducer (i.e., a piezoelectric transducer).

The tanks 809 that contain therein the ink to be supplied to the print head 808 are detachably mounted on the carriage 805. In the present embodiment, there are mounted a tank 809-BK containing a black ink, a tank 809-C containing a cyan ink, a tank 809-M containing a magenta ink, and a tank 809-Ye containing a yellow ink. Each of the inks is supplied to the print head corresponding to each of the colors.

The printing apparatus is provided with a control unit 100 including a control circuit such as a CPU or an ASIC, and a ROM, a RAM, and the like connected to the control circuit. The control unit 100 receives information on a print mode or print information from a controller included in an outside host apparatus 10 via an interface. The control unit 100 controls a head drive circuit 110 for driving the print heads 808 based on the received information or print information together with a drive source such as the conveyance motor 803 or the carriage motor 806 so as to control the conveyance of the print medium P and the ink ejection from the print heads 808. In this manner, a color image is printed on the print medium P.

Figure 2:
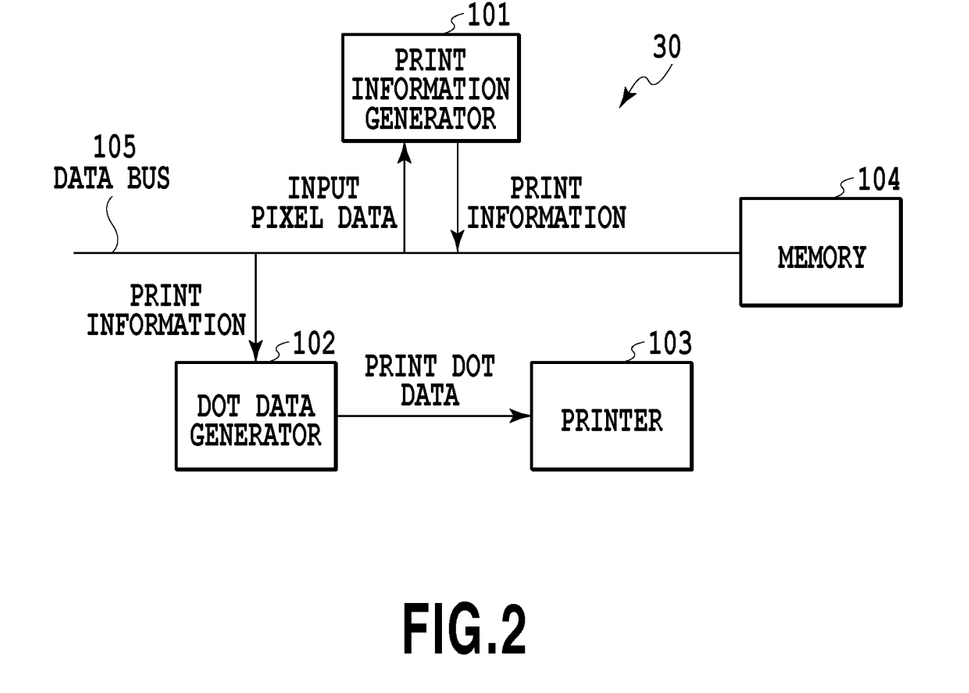
FIG. 2 is a block diagram illustrating the configuration of a print information processor in the embodiments.

FIG. 2 shows the configuration of a print information processor 30 in the printing apparatus 20 in the present embodiment. In the print information processor 30, pixel data (i.e., input pixel data) from the host apparatus 10 is converted into encoded print information in a print information generator 101. The print information is stored in a memory 104 via a data bus 105. A dot data generator 102 receives the encoded print information stored in the memory 104 via the data bus 105, and then, generates, based on the print information, print dot data that is used for printing dots by the print heads 808 disposed in a printer 103. So-called two-pass printing is performed in the present embodiment: specifically, the print head 808 performs main scanning (a first pass and a second pass) in a main scanning direction (i.e., the X direction) so as to complete an image in a predetermined area. For this purpose, the dot data generator 102 generates dot data (i.e., first dot data) used for printing dots in the first pass and dot data (i.e., second dot data) used for printing dots in the second pass.

Figure 3:
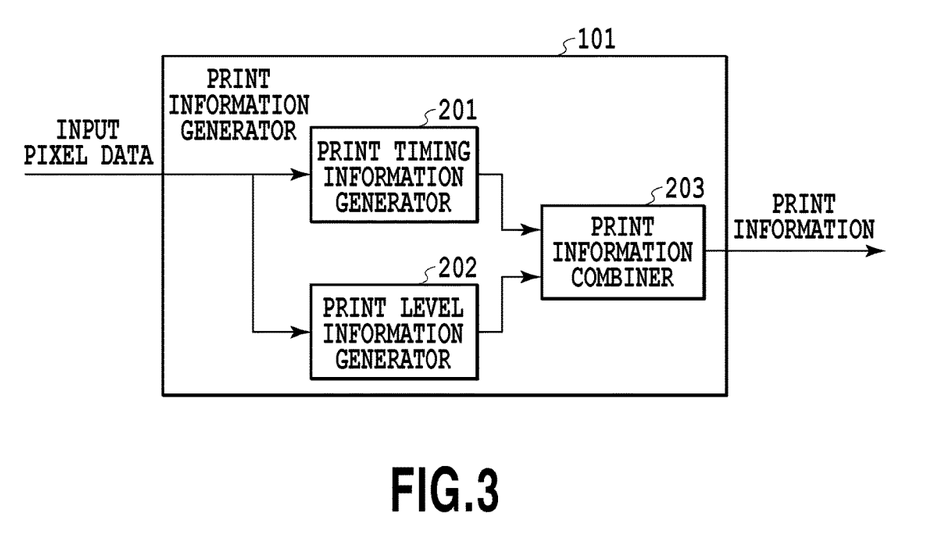
FIG. 3 is a block diagram illustrating the configuration of a print information generator in the embodiments.

Here, the configurations of the print information generator 101 and the dot data generator 102 will be explained with reference to FIG. 3 and FIG. 4. FIG. 3 is a block diagram illustrating the configuration of the print information generator 101. As illustrated in FIG. 3, the print information generator 101 includes a print timing information generator 201, a print level information generator 202, and a print information combiner 203.

The print timing information generator 201 has the function of generating print timing information on a timing at which ink is applied within a predetermined ink application area based on input pixel data. The print timing information represents a timing at which the ink is applied onto the print medium P so as to form dots, and is used to control the overprinting of dots in printing a plurality of dots at the same position. In the present embodiment in which printing at an early timing is represented by "0" whereas printing at a late timing is represented by "1," data of 1 bit is output. When dots are formed at the same position of the print medium P in overprinting, a dot printed at a late timing is overprinted on a dot printed at an early timing.

Figure 5A:
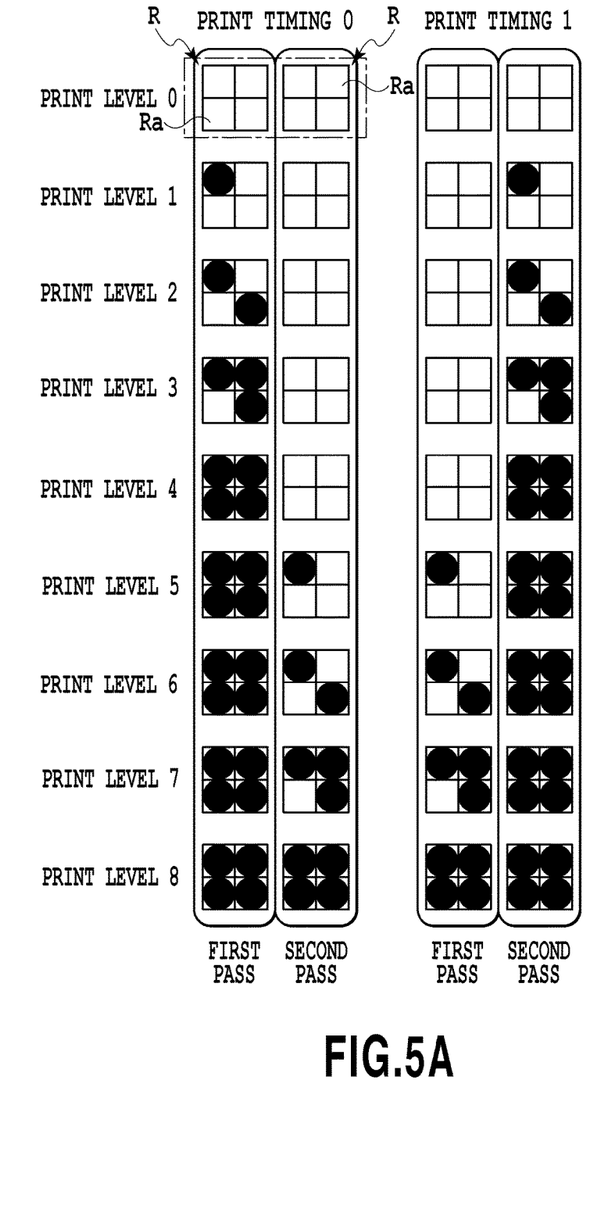
FIGS. 5A and 5B are diagrams schematically illustrating a state in which dots are formed in a first embodiment.

The print level information generator 202 generates data indicating the density of an image to be printed within a predetermined area (i.e., an output pixel) determined on the print medium P according to the gradation value of the input pixel data. Here, an input pixel indicates a minimum unit per which gradation can be represented, and furthermore, a minimum unit per which multivalued input image data is subjected to image processing. In contrast, an output pixel indicates an area on the print medium P according to the input pixel. The output pixel is as a minimum unit which is defined as an area where it is determined whether or not a dot is formed, and the plurality of areas are arranged in vertical and horizontal directions (in the X direction and the Y direction). Specifically, as illustrated in FIG. 5A, a predetermined area consisting of two areas Ra in a vertical direction and two areas Ra in a lateral direction (four areas in total) forms an output pixel R. At this output pixel R, eight dots at the maximum are formed by two main scannings by the print head. The number of dots to be formed at the output pixel R is determined based on the print level information. As a consequence, the print level information in the present embodiment is four-bit information representing nine gradation levels from a print level 0 at which no dot is printed within the output pixel R to a print level 8 at which eight dots are printed within the output pixel R.

Figure 5B:
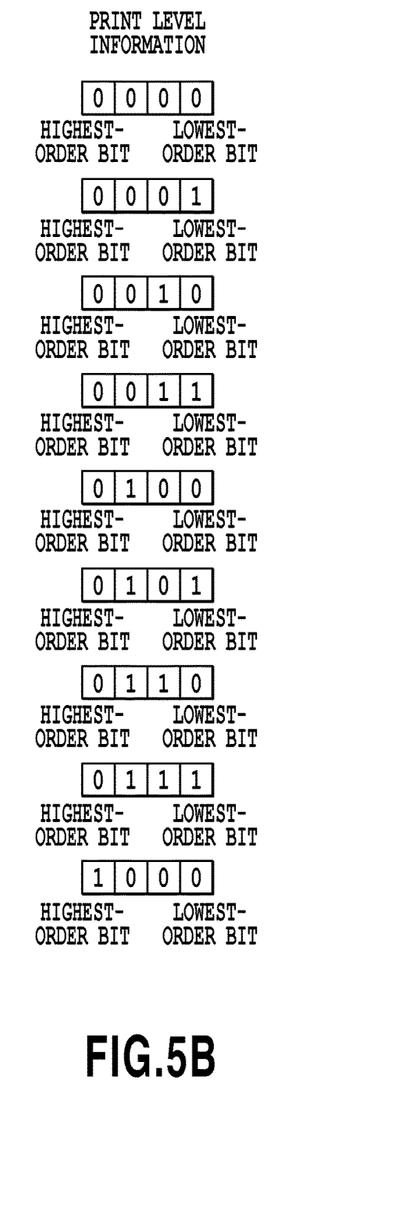

FIGS. 5A and 5B schematically illustrate a state in which the dots are formed on the print medium P based on combinations of the print timing information and the print level information. As illustrated in FIGS. 5A and 5B, in the case of a print level 1 (in the case of the print level information of "0001"), one dot is formed within the output pixel. At this time, one dot is formed by the first scanning (i.e., in the first pass) so that the dot should be printed at an early timing if the print timing information is In contrast, if the print timing information is "1," one dot is formed by the second scanning (i.e., in the second pass) so that the dot should be printed at a late timing.

In the case of a print level 4 (in the case of the print level information of "0100"), four dots are formed within the output pixel. At this time, if the print timing information is "0," four dots are formed at the output pixel R in the first pass whereas no dot is formed in the second pass. In contrast, if the print timing information is "1," no dot is formed in the first pass whereas four dots are formed at the output pixel R in the second pass.

In the case of a print level 5 (in the case of the print level information of "0101"), five dots are formed within the output pixel R. Here, not more than four dots can be formed within one output pixel R in one pass. Therefore, in a case where the print level 5 is designated, four dots are formed within the output pixel R in the first pass if the print timing information is "0," and then, one dot is overprinted, in the second pass, on one of the dots formed within the same output pixel R. Moreover, in a case where the print timing information is "1," one dot is formed within the output pixel R in the first pass, and then, four dots are formed within the output pixel R in the second pass.

Furthermore, in the case of the print level 0 (in the case of print level information of "0000"), no dot is formed within the output pixel R irrespective of the print timing. To the contrary, in the case of the print level 8 (in the case of print level information of "1000"), dots are overprinted at all areas (i.e., four areas) Ra within the output pixel R irrespective of the print timing. As a consequence, in the case of the print level 0 and the print level 8, it is unnecessary to control the print timing of the print head.

In view of the above, the print information combiner 203 combines the print timing information of 1 bit generated by the print timing information generator 201 and the print level information of 4 bits generated by the print level information generator 202, and then, outputs print information of not 5 bits but 4 bits. Specifically, in a case where the print level represented by the print level information ranges from "1" to "7," the print level information is assigned to the low-order three bits out of the four bits of the print information whereas the print timing information is assigned to the high-order one bit. Moreover, in a case where the print level is "0" or "8," the control of the print timing is not needed, as described above, and thus, the print level information of four bits is output as the print information as it is.

Figure 4:
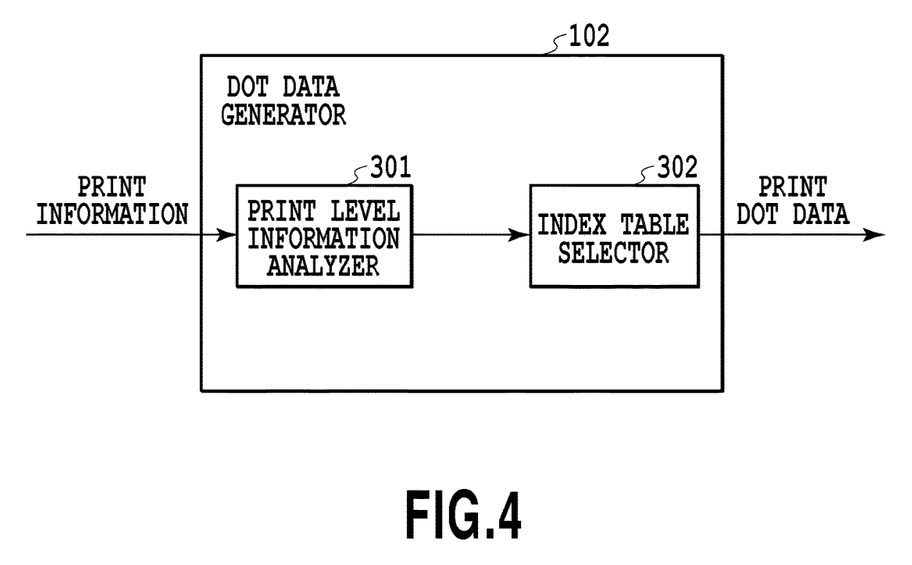
FIG. 4 is a block diagram illustrating the configuration of a dot data generator in the embodiments.

The dot data generator 102 illustrated in FIG. 4 includes a print level information analyzer 301 and an index table selector 302. The print level information analyzer 301 acquires the print level information and the print timing information from the print information transmitted from the above-described print information generator 101, and then, transmits each of the pieces of information to the index table selector (i.e., a dot data acquirer) 302 provided at a rear stage. The index table selector 302 selects corresponding dot data from an index table based on the print level information and the print timing information received by the print level information analyzer 301, and then, outputs it. This index table stores therein a plurality of pieces of dot data to be used in forming dots within the predetermined area in a number corresponding to the plurality of print levels in different patterns according to the plurality of print timings. Here, the index table is stored in a predetermined memory in the control unit 100. The control unit 100 drives the head drive circuit 110 based on the print dot data so as to drive each of the ejection energy generating elements in the print heads (i.e., print units) 808, thus forming an image on the print medium P.

Figure 6:
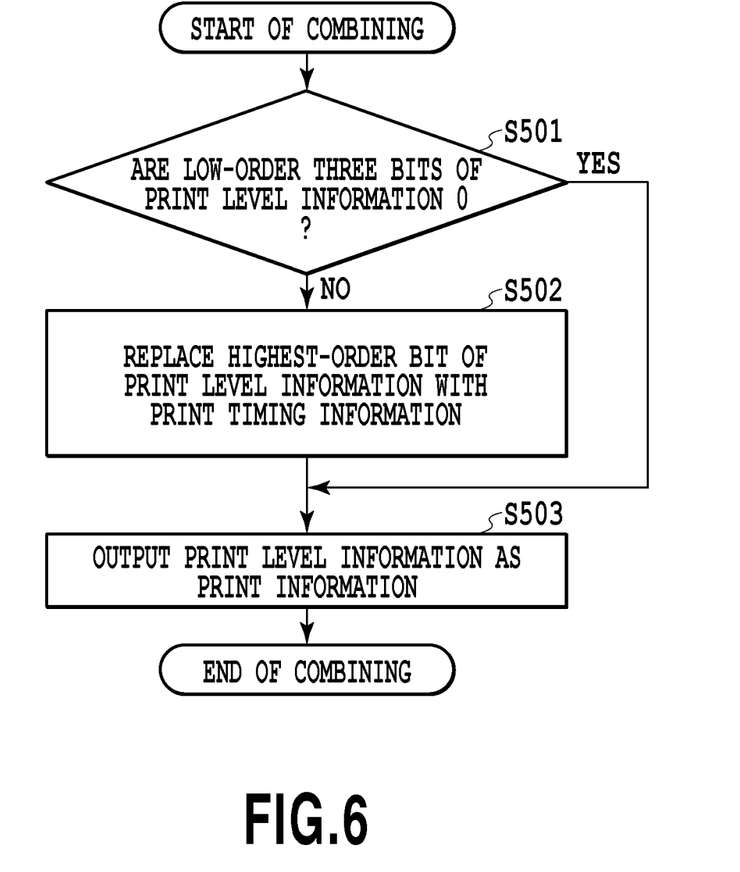
FIG. 6 is a flowchart illustrating processing to be performed by a print information combiner in the first embodiment.

FIG. 6 is a flowchart illustrating information processing to be performed in the print information combiner 203. After acquiring the print level information and the print timing information, the print information combiner 203 generates the print information in steps S501 to S503. In step S501, it is determined whether or not the low-order three bits of the acquired print level information are 0. If it is determined that the low-order three bits are 0, it is found that the print level is "0" or "8," and then, the control routine jumps to step S503, in which the print level information is output as the print information as it is. In contrast, if it is determined that the low-order three bits are not 0, the control routine proceeds to step S502, in which the highest-order bit of the print level information is replaced with the print timing information. Thereafter, the control routine proceeds to step S503, in which the print level information obtained by replacing the highest-order bit (i.e., the replaced bit) with the print timing information is output as the print information. In this manner, the processing for combining the print level information and the print timing information comes to an end.

Figure 7A:
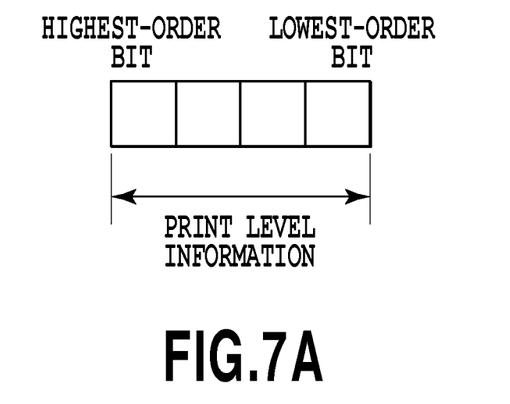
FIGS. 7A and 7B are diagrams illustrating the configuration of print information in the first embodiment.
Figure 7B:
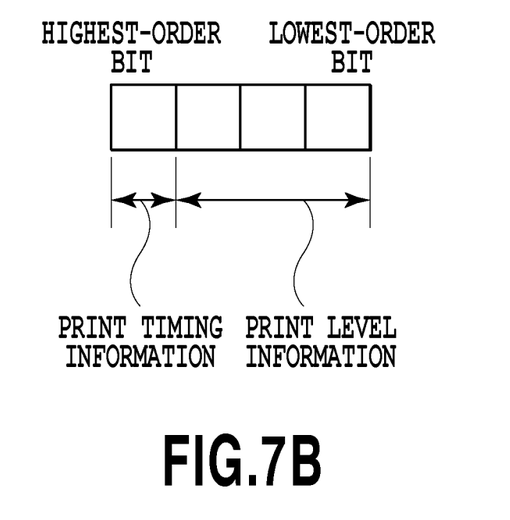

FIG. 7A and FIG. 7B illustrate the configuration of the print information obtained in the above-described processing. FIG. 7A illustrates the configuration of the print information in a case where the low-order three bits are 0: in contrast, FIG. 7B illustrates the configuration of the print information in a case where the low-order three bits are not 0. As illustrated, in the present embodiment, the print information combiner 203 combines the print timing information of one bit generated by the print timing information generator 201 and the print level information of four bits generated by the print level information generator 202, thus obtaining the print information of four bits. In this manner, the data amount of the print information to be output from the print information generator 101 can be reduced in comparison with the conventional technique in which the print timing information of one bit and the print level information of four bits are transmitted independently of each other. As a consequence, the band of the data bus 105, via which the print information is transmitted from the print information generator 101 to the dot data generator 102, can be reduced.

Figure 8:
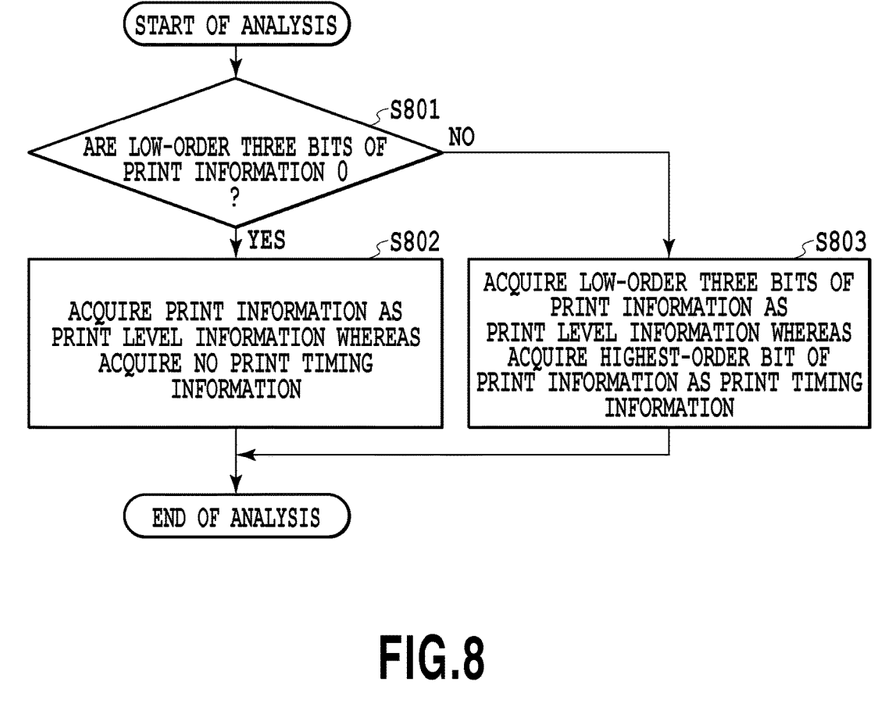
FIG. 8 is a flowchart illustrating processing to be performed by a print level information analyzer.

FIG. 8 is a flowchart illustrating processing to be performed by the above-described print level information analyzer 301. The print level information analyzer (i.e., a print level information analyzing unit) 301 acquires the print information, and then, performs the processing in step S801 to step S803 so as to acquire the print level information and the print timing information. Specifically, it is determined in step S801 whether or not the low-order three bits of the acquired print information are 0. If it is determined that the low-order three bits are 0, the control routine proceeds to step S802, in which the print information of four bits is acquired as the print level information as it is. In contrast, if it is determined that the low-order three bits are not 0, the control routine proceeds to step S803, in which the low-order three bits of the print information are acquired as the print level information whereas high-order one bit of the print information is acquired as the print timing information. The print level information and print timing information acquired herein are transmitted to the index table selector 302, as described above, and then, are used for selecting dot data. The selected dot data is used for performing a printing operation at an early timing illustrated in FIG. 5A or for performing a printing operation at a late timing illustrated in FIG. 5B. In this manner, the dot data is selected according to the ejection of various kinds of ink, thus making it possible to control the overprinting order of the different kinds of ink within a single output pixel R in such a manner as to exhibit a certain tendency. For example, in a case where a dot of a magenta (M) ink is overprinted on a dot of a cyan (C) ink, the dot data on the cyan (C) ink is output at the print timing "0" illustrated in FIG. 5A whereas the dot data on the magenta (M) ink is output at the print timing "1" illustrated in FIG. 5A. In this manner, more dots are formed with the cyan (C) ink at an early print timing (i.e., in the first pass) whereas more dots are formed with the magenta (M) ink at a late print timing (i.e., in the second pass). As a consequence, the tendency that the more dots formed with the magenta ink are overprinted on the more dots formed with the cyan ink achieves the formation of an image in a desired color.

Second Embodiment

Subsequently, a second embodiment according to the present invention will be described with reference to FIG. 9A and FIG. 9B. Here, a printing apparatus in the present embodiment also has the configuration shown in FIG. 1 to FIG. 4, like the first embodiment.

The two-pass printing is performed in the first embodiment such that the print heads 808 perform the main scanning twice so as to complete the image at the predetermined area. However, according to the present invention, the print heads 808 may perform main scanning twice or more so as to complete an image at a predetermined area. In the second embodiment, print heads 808 perform main scanning four times so as to complete an image at a predetermined area. FIG. 9A and FIG. 9B schematically illustrate a state in which dots are formed on a print medium P based on the combinations of print timing information and print level information in the second embodiment.

Figure 9A:
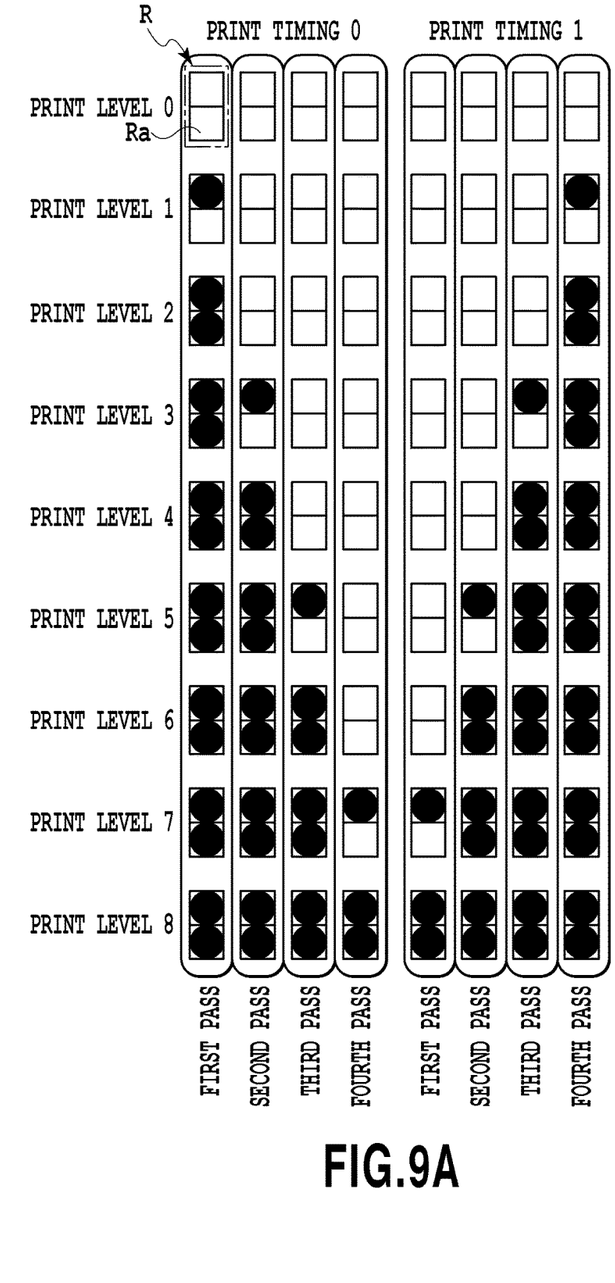
FIGS. 9A and 9B are diagrams schematically illustrating a state in which dots are formed in a second embodiment.
Figure 9B:
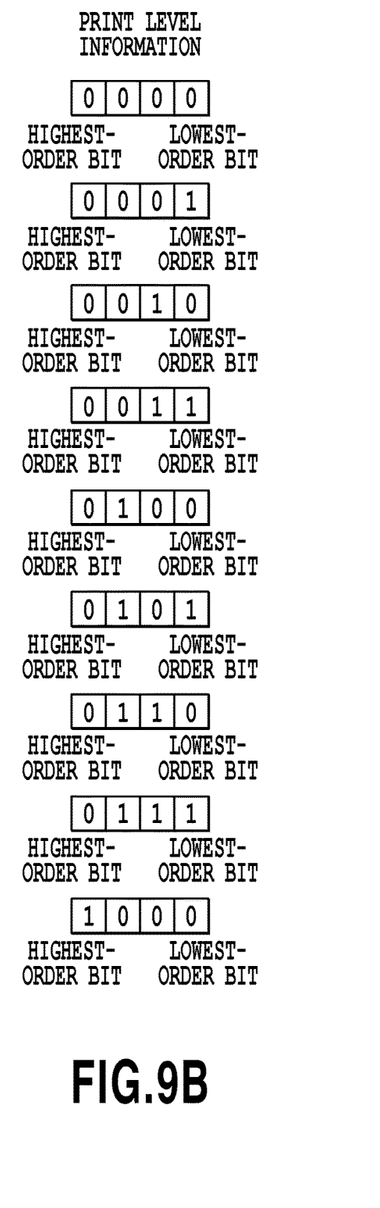

As illustrated in FIG. 9A, an output pixel R consists of two areas in a vertical direction and one area in a lateral direction (two areas in total) in the second embodiment. Eight dots at the maximum are formed at the output pixel R by the main scanning four times by the print head. The number of dots to be formed at one pixel R is determined based on print level information. As a consequence, also in the second embodiment, the print level information includes information on nine levels (four bits), that is, from a print level 0 in which no dot is printed within the output pixel R to a print level 8 in which eight dots are printed within the output pixel R.

Data of one bit is used as the print timing information representing a timing at which a dot is formed at the pixel R, and represents two kinds of print timings, that is, an early print timing and a late print timing. Here, the print timing information representing an early print timing is designated by "0" whereas the print timing information representing a late print timing is designated by "1."

Also in the second embodiment, a print information combiner 203 combines the print level information of four bits and the print timing information of one bit so as to output print information of not five bits but four bits, like in the first embodiment. Consequently, it is possible to reduce the size of data to be transmitted from a print information generator 101 to a dot data generator 102 so as to reduce the band of a data bus 105.

Third Embodiment

Next, a third embodiment according to the present invention will be described with reference to FIG. 10A, FIG. 10B, and FIG. 11. Here, a printing apparatus in the present embodiment also has the configuration shown in FIG. 1 to FIG. 4, like the first embodiment.

The first and second embodiments adduce the example in which the two kinds of print timings are set based on the print timing information of one bit. However, the two or more kinds of print timings may be set based on print timing information of one or more bits. In the third embodiment, four kinds of print timings can be set based on print timing information of two bits.

Figure 10:
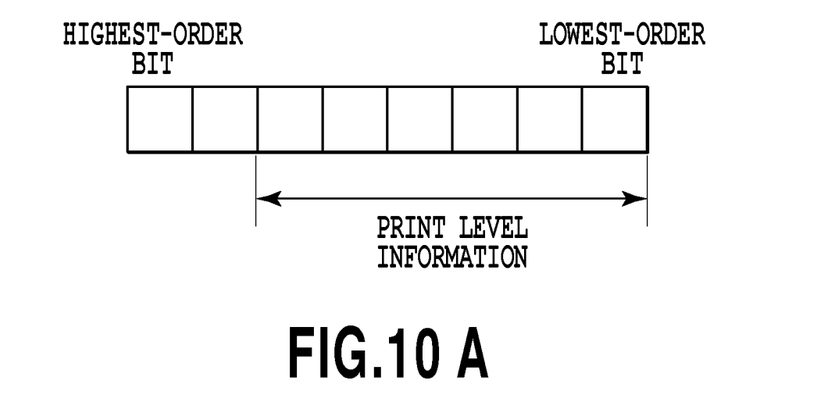
FIGS. 10A and 10B are diagrams illustrating the configuration of print information in a third embodiment.

FIG. 10A and FIG. 10B illustrate the constitutional example of print information that is obtained by combining print timing information and print level information by a print information combiner (i.e., a print information combining unit) 203 (see FIG. 3) in the third embodiment. Here, an example is illustrated in which the print timing information output from a print timing information generator 201 is data of three bits for setting eight kinds of print timings. Moreover, an example is illustrated in which the print level information output from a print level information generator 202 is data of six bits for setting 65 gradations.

FIG. 10A illustrates the configuration of print information in a case where low-order five bits in the print level information are 0: in contrast, FIG. 10B illustrates the configuration of print information in a case where low-order five bits in the print level information are not 0. In other words, there is illustrated print information in a case where low-order five bits are 0, that is, no dot is formed at an output pixel or in a case where dots are formed at all areas at an output pixel. In this case, no print timing information is required, and therefore, the high-order two bits of the print information take arbitrary values. In a case where the print timing information has two or more bits, a part of the print level information (here, a highest-order bit) is replaced with at least a part of the print timing information (here, one bit). As a consequence, the data amount of the print information (i.e., the number of bits) takes a value obtained by subtracting one from a value obtained by adding the data amount (i.e., the number of bits) of print timing information to the data amount of the print level information (i.e., the number of bits).

That is to say, in a case where the print timing information has data of n bits whereas the print level information has data of (m+1) bits, the print information obtained by combining both of the pieces of information has data of (n+m) bits. With this synthesis scheme, the amount of data to be transmitted from a print information generator 101 to a dot data generator 102 is reduced, thus reducing the band of a data bus 105.

Figure 11:
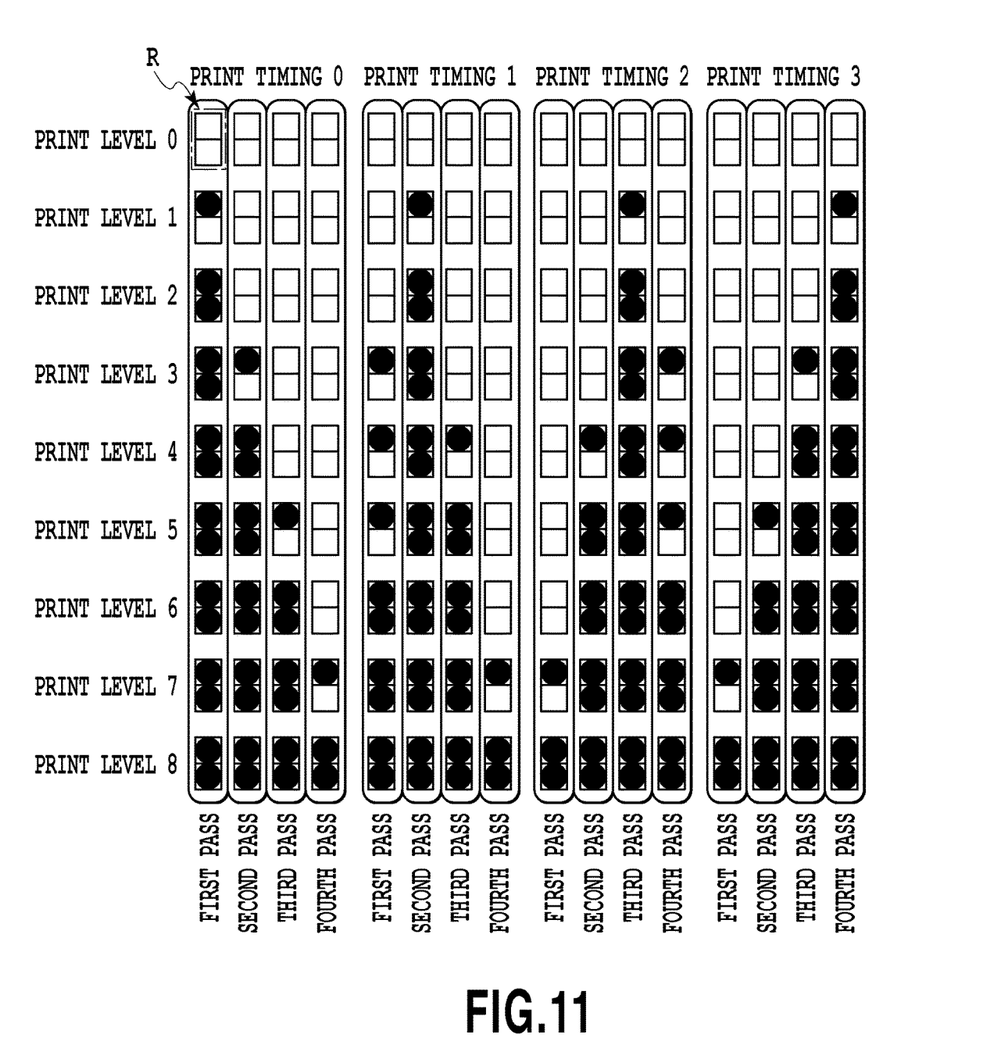
FIG. 11 is a diagram schematically illustrating a state in which dots are formed in the third embodiment.

FIG. 11 schematically illustrates a state in which dots are formed on a print medium P according to the combinations of print timings and print levels in a case where the print timing information consists of two bits. In an example illustrated in FIG. 11, areas consisting of two areas in a vertical direction and one area in a lateral direction (i.e., two areas) are referred to as an output pixel R. Eight dots at the maximum are formed at each of the pixels R by main scanning four times, like in the second embodiment. The print level information representing the number of dots to be formed within an output pixel R has data of four bits representing nine gradations, that is, from a print level 0 to a print level 8. This point is the same as the second embodiment.

However, in the present example, four kinds of print timings are set based on the print timing information of two bits. This point is different from the second embodiment. Four kinds of print timings "0," "1," "2," and "3" are set. In a case where dots need to be formed at an early timing, the print timing information "0" is set. More dots are formed at an early print timing (e.g., in a first pass or a second pass) in the number of dots to be printed. In contrast, in a case where dots are required to be formed at as late a timing as possible, the print timing information "3" is set. More dots are printed at a later print timing (e.g., a fourth pass or a third pass).

In this example, the print timing information generated by the print timing information generator (i.e., a print timing information generating unit) 201 (FIG. 3) is data of two bits (n bits). Moreover, the print level information generated by the print level information generator (i.e., a print level information generating unit) 202 (FIG. 3) is data of six bits (m+1 bits). The print information generated by the print information combiner 203 based on these pieces of information generates the print timing information of n bits+m bits=7 bits according to the above-described synthesis scheme. In this manner, also in the present example, the amount of data possessed by the print information is less than the amount of data obtained by simply adding the print level information and the print timing information (i.e., eight bits). Consequently, it is possible to reduce the amount of data to be transmitted from the print information generator 101 to the dot data generator (i.e., a dot data generating unit) 102 so as to reduce the band of the data bus 105. (Other Embodiments)

Embodiment(s) of the present invention can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

Although each of the above-described embodiments has exemplified the case where the bits (lower bits) other than the highest-order bit of the print level information representing the maximum or minimum print level are 0, the bits other than the highest-order bit may be 1. Moreover, although the description has been given of the example in which the data to be replaced with the print timing information during the print information production is the highest-order bit of the data representing the print level information, data at a digit other than the highest digit of the data representing the print level information may be replaced with one arbitrary bit of the print level information.

According to the present invention, it is possible to reduce the data amount of print information to be used for printing an image on the print medium so as to reduce the band, via which the print information is transmitted.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2016-087217, filed Apr. 25, 2016, which is hereby incorporated by reference wherein in its entirety.

What is claimed is:

1. A print information processing apparatus comprising:
    a print level information generating unit configured to generate print level information representing an amount of ink to be applied to a predetermined area on a print medium based on input pixel data;
    a print timing information generating unit configured to generate print timing information indicating a timing, at which the ink is applied to the predetermined area, based on the input pixel data; and
    a print information combining unit configured to combine the print level information and the print timing information so as to generate print information,
    wherein the print information combining unit outputs the print level information as the print information in a case where the amount of ink to be applied to the predetermined area is maximum or minimum, and
    the print information combining unit replaces a part of the print level information with at least a part of the print timing information so as to output, as the print information, information obtained by combining the print timing information and the print level information in a case where the amount of ink to be applied to the predetermined area is not maximum or minimum.

2. The print information processing apparatus according to claim 1, wherein in a case where the print timing information is data of n bits and the print level information is data of m+1 bits, the print information combining unit outputs the data of n+m bits as the print information.

3. The print information processing apparatus according to claim 1, wherein the print information combining unit uses data of one bit included in the print level information as a replacement bit, and then, replaces the replacement bit with data of one bit included in the print timing information in a case where the amount of ink to be applied to the predetermined area is not maximum or minimum.

4. The print information processing apparatus according to claim 3, wherein the print information combining unit determines, based on data other than the replacement bit in the print level information, whether or not the amount of ink to be applied to the predetermined area is maximum or minimum.

5. The print information processing apparatus according to claim 1, further comprising:
    a dot data generating unit configured to generate, based on the print information, dot data to be used for ejecting ink from a printing unit that ejects the ink so as to form dots on the print medium,
    wherein the dot data generating unit includes:
    a print level information analyzing unit configured to acquire the print level information and the print timing information based on the print information; and
    a dot data acquiring unit configured to acquire the dot data based on the print level information and the print timing information.

6. The print information processing apparatus according to claim 5, further comprising:
    an index table that stores therein a plurality of pieces of dot data used for forming dots within the predetermined area in a number corresponding to the plurality of print levels at different patterns according to the plurality of print timings,
    wherein the dot data acquiring unit acquires the dot data from the index table based on the print level information and the print timing information acquired in the print level information analyzing unit.

7. The print information processing apparatus according to claim 5, wherein the print information generating unit and the dot data generating unit are connected to each other via a data bus.

8. The print information processing apparatus according to claim 1, further comprising:
a controlling unit controlling printing such that (i) ink is applied to all pixels in the predetermined area at a same time in each of printing timings, in a case where the amount of ink to be applied to the predetermined area is maximum, and (ii) ink is not applied to any pixels in the predetermined area in each of printing timings, in a case where the amount of ink to be applied to the predetermined area is minimum.

9. The print information processing apparatus according to claim 1, further comprising:
a print head for ejecting ink to perform printing.

10. A print information processing apparatus comprising:
a print level information generating unit configured to generate print level information representing an amount of ink to be applied to a predetermined area on a print medium based on input pixel data;
a print timing information generating unit configured to generate print timing information indicating a timing, at which the ink is applied to the predetermined area, based on the input pixel data; and
a print information combining unit configured to combine the print level information and the print timing information so as to generate print information,
wherein the print information combining unit outputs the print level information as the print information (i) in a case where ink is applied to all pixels in the predetermined area at a same time in each of printing timings, or (ii) in a case where ink is not applied to any pixels in the predetermined area in each of printing timings, and
the print information combining unit replaces part of the print level information with at least part of the print timing information so as to output, as the print information, information obtained by combining the print timing information and the print level information, in a case where ink is applied to a first number of pixels in the predetermined area in a first printing timing and ink is applied to a second number of pixels in the predetermined area in a second printing timing, the second number being different from the first number, and the second printing timing being different from the first printing timing.

11. A print information processing method comprising the steps of:
generating print level information representing an amount of ink to be applied to a predetermined area on a print medium based on input pixel data;
generating print timing information indicating a timing, at which ink is applied to the predetermined area, based on the input pixel data; and
combining the print level information and the print timing information so as to generate print information,
wherein in the print level information combining step, the print level information is output as the print information in a case where the amount of ink to be applied to the predetermined area is maximum or minimum and part of the print level information is replaced with at least part of the print timing information so as to output, as the print information, information obtained by combining the print timing information and the print level information in a case where the amount of ink to be applied to the predetermined area is not maximum or minimum.

* * * * *